UNITED STATES PATENT OFFICE.

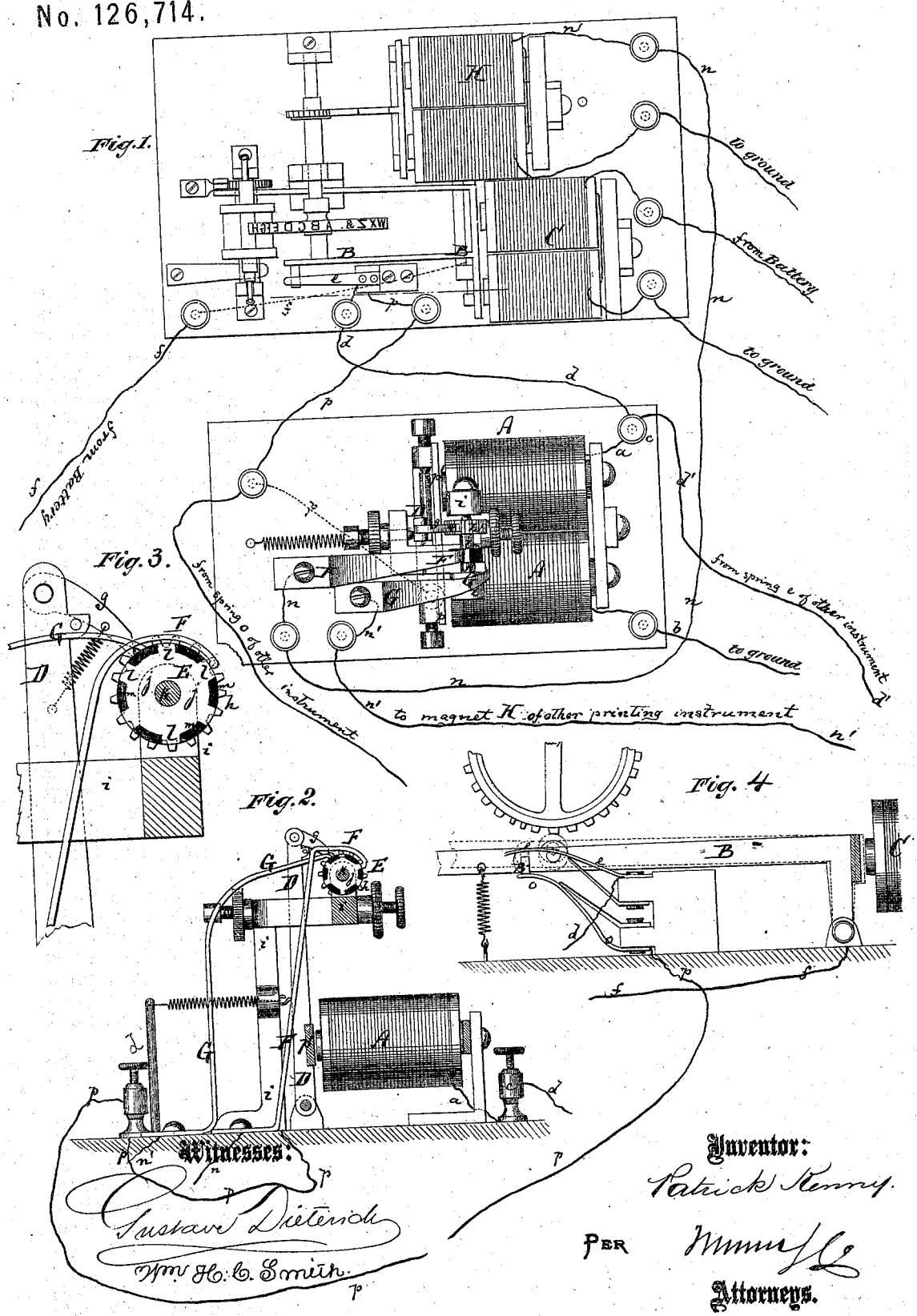

PATRICK KENNY, OF NEW YORK, N. Y.

IMPROVEMENT IN SWITCHES FOR PRINTING-TELEGRAPHS.

Specification forming part of Letters Patent No. 126,714, dated May 14, 1872.

*To all whom it may concern:*

Be it known that I, PATRICK KENNY, of the city, county, and State of New York, have invented a new and Improved Connecting-Switch for two or more Telegraphic-Printing Instruments; and I do hereby declare that the following is a full, clear, and exact description thereof, which will enable others skilled in the art to make and use the same, reference being had to the accompanying drawing forming part of this specification.

The object of this invention is to produce a simple and reliable switch-instrument, whereby one of two or more telegraphic-printing instruments can be conveniently connected with the battery and the remainder detached.

In working with several telegraphic-printing instruments it is frequently desirable for one operator to use them in rapid succession for different matter, without changing the different keys or using a separate battery for each.

The invention will first be fully described, in connection with all that is necessary to a full understanding thereof, and then pointed out in the claim.

In the accompanying drawing, Figure 1 represents a plan or top view of my new switch-instrument, showing it connected with one printing-instrument, and with a wire leading to another. Fig. 2 is a side elevation of my new switch-instrument. Fig. 3 is a detail side view on an enlarged scale of the circuit-breaking and closing wheel and springs used on my improved switch. Fig. 4 is a detail side view, on an enlarged scale, of the printing-lever and connecting springs.

Similar letters of reference indicate corresponding parts.

A represents the electro-magnet of the switch-instrument, connected by a wire, $a$, with the battery, and by another wire, $b$, with the ground. The wire $b$ leads through a suitable key, which must be touched in order to establish a current, provided the connection with the battery is uninterrupted. The wire $a$ leads to a cup, $c$, whence it is branched at $d$ $d'$, each branch leading to a spring, $e$, on one of the printing-instruments. The printing-lever B of each printing-instrument when raised, *i. e.*, attracted by its magnet C, comes in contact with the spring $e$, as indicated by dotted lines in Fig. 4, and establishes metallic connection between the wire $a$ and a wire, $f$, leading immediately from the battery to the supports of said lever B. When the printing-lever B is lowered, as shown by full lines in Fig. 4, it is disconnected from the spring $e$. In order to complete the circuit through the magnet A, it is, therefore, necessary that the lever B be raised and the aforementioned key touched at the same time, either of them alone being insufficient. D is the armature-lever of the switch-instrument. It carries at its upper end a pawl, $g$, which engages in a notched or toothed wheel, $h$, that has its bearings in a fork or post, $i$, projecting from the bed or base of the switch-instrument. A wheel, E, is mounted upon the axle K of the toothed wheel $h$. This wheel E has a metallic inner part, $j$, in contact with the axle K, and a series of equidistant radial arms, $l$ $l$, projecting from said inner part $j$. Between the arms $l$ are fitted pieces $m$ of non-conducting material. F G are metal springs connected by wires $n$ $n'$, respectively, with the electro-magnets H (of which but one is shown) of the type-wheel turning instruments. The ends of these springs are in contact with the periphery or sides of the wheel E, but so spaced that only one can be in contact with a metal arm, $l$, the other or others being in contact with the insulating pieces $m$. A suitable number of such springs, according to the number of instruments to be connected, may thus be in contact with the wheel E. The printing-lever B when at rest is in metallic contact with a spring, $o$, which is, by a wire, $p$, connected with the post $i$, and therefore in metallic contact with the axle K and metal arms $l$ of the wheel E.

The operation is as follows: As long as the lever B is at rest—*i. e.*, in contact with the spring $o$—that printing-instrument which, by its connection with a spring, F or G, is in metallic connection with one arm, $l$, of the switch-wheel E, will have a circuit established through its magnet H. All the other printing-instruments connecting with the same switch-wheel have their circuits broken by the insulating pieces $m$ of the same. The instrument whose magnet H is thus charged can be worked by the keys in the ordinary manner, the printing-lever B being caused to vibrate by a separate key each time a type has been set in position for printing. Whenever the printing-lever B is thus raised it interrupts momentarily the connection with the spring $o$, and establishes, through the spring $e$, metallic connection with the magnet A of the switch-instrument. This enables the operator, by a mere touch of the appropriate key, to establish a circuit through the magnet A, causing the armature $p'$ to be attracted, and the lever D to be swung so as to move the wheels $h$ and E and bring another spring, F or G, in metallic contact with the wheel E. The key to the magnet A may be touched one or more times, in order to obtain the desired position of the wheel E, if more than two instruments are connected with the switch. Whatever printing-instrument is thus brought into metallic contact with the wheel E can be worked, all the others being out of gear. If, during the elevation of the lever B, the key to the switch-instrument is not touched, the printing instrument having such lever B remains in circuit after the descent of the same. While the key to the switch-instrument is being worked, supposing more than one motion of it to be necessary, the hand must remain on the key which operates the printing-lever in order to retain the same in the elevated position.

It is evident that the printing-instruments connected with the switch-instrument may be of suitable varying construction, which does not form part of this invention.

Having thus described my invention, I claim as new and desire to secure by Letters Patent—

1. The printing-lever B, arranged between the springs $e$ and $o$ to establish, by its movements, alternate connections with the magnets A and H, substantially as herein specified and described.

2. The printing-lever B, arranged between the springs $e$ and $o$, in combination with the switch-instrument described, and the various printing instruments on same line, substantially as and for the purpose herein described.

PATRICK KENNY.

Witnesses:
T. B. MOSHER,
GEORGE W. MABEE.